United States Patent [19]
Brostedt et al.

[11] Patent Number: 5,984,684
[45] Date of Patent: Nov. 16, 1999

[54] METHOD AND SYSTEM FOR TEACHING PHYSICAL SKILLS

[76] Inventors: Per-Arne Brostedt; Charlotte Montgomery Brostedt, both of Villagatan 4, S-11432 Stockholm, Sweden

[21] Appl. No.: 08/758,673

[22] Filed: Dec. 2, 1996

[51] Int. Cl.$^6$ .................................................. A63B 69/00
[52] U.S. Cl. ......................... 434/252; 434/247; 473/131
[58] Field of Search ................................. 434/247, 252, 434/21, 44; 473/208, 131, 151, 152, 209, 257, 267, 274, 409; 482/900–902; 356/21

[56] References Cited

U.S. PATENT DOCUMENTS

| | | | |
|---|---|---|---|
| 3,408,750 | 11/1968 | McCollough | ................................. 35/29 |
| 5,249,967 | 10/1993 | O'Leary | ................................... 434/247 |
| 5,306,012 | 4/1994 | Fujita | ....................................... 273/187 |
| 5,603,617 | 2/1997 | Light | ........................................ 424/252 |

FOREIGN PATENT DOCUMENTS

| | | |
|---|---|---|
| 1139388 | 6/1997 | China . |
| 8280863 | 1/1996 | Japan . |
| 9300970 | 1/1993 | WIPO . |
| 9400459 | 3/1995 | WIPO . |

*Primary Examiner*—Glenn E. Richman
*Attorney, Agent, or Firm*—Donald J. Lenkszus; Bryan Cave, LLP

[57] ABSTRACT

A system and method for the teaching of physical skills such as golf by the use of video reproduction utilizes a reverse image video by an instructor. In addition, the student receives the reverse image video on a pair of video glasses. The student does not have to perform a mental right-left translation when viewing the instructor.

20 Claims, 6 Drawing Sheets

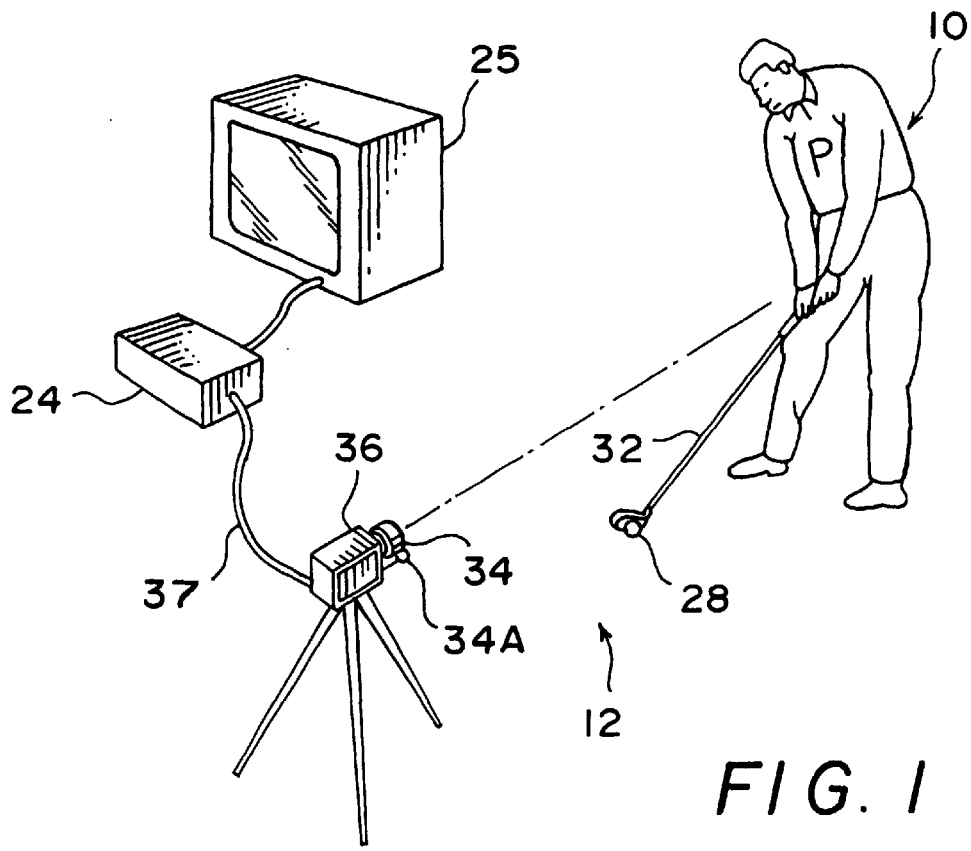
FIG. 1
FIG. 2
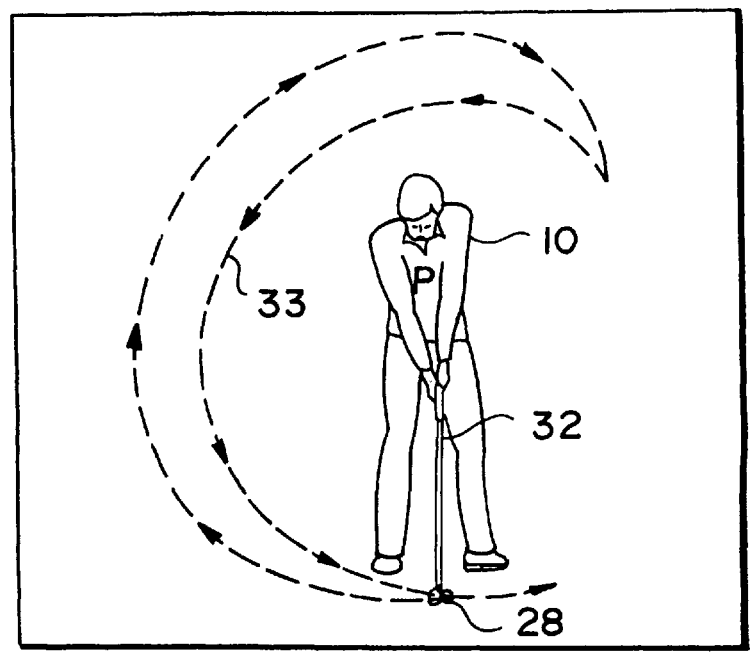

METHOD AND SYSTEM FOR TEACHING PHYSICAL SKILLS

BACKGROUND OF THE INVENTION

This invention pertains to a method and system for teaching a physical skill. More specifically, the invention pertains to a method and apparatus wherein the positioning and body motions of an instructor are to be learned by a student.

Physical skills or manual tasks may be defined as tasks where the human being inputs some kind of controlled physical effort and receives feedback information as to the result of the controlled effort. Included within such tasks are those performed with the arms, hands and legs. Also included are tasks performed with the aid of machines, tools or instruments to provide mechanical advantage, accuracy, speed, force or stability. Such tasks are found in every day life, in sports and in work. Examples of such tasks in sports includes shooting basketballs, shooting arrows, hitting tennis balls and swinging golf clubs to hit golf balls.

Many attempts have been made to develop systems and methods which permit the teaching or training of physical skills and manual tasks. The teaching of golf is representative of the type of physical skill in which it is extremely difficult for students to learn even from one having an exceptionally good skill set. More specifically, learning to perfect a golf swing is a challenge for most golfers even under the training of the most experienced golf professionals. All methods of effective golf training developed to date utilize some method of feedback so that the student can visualize how to make changes in his or her golf swing to more closely approximate a desired golf swing.

One approach which has been developed in the past utilizes video technology. In the video systems which have been developed to date, a video image of a professional golfer is shown to the student. The student after viewing the professional's golf swing, then attempts to mimic the swing.

In some systems, the student's swing is also videotaped and shown back to the student so that he can compare his/her swing to that of the professional. In other systems, the student's swing is viewed at the same time as the video of the professional by use of split screen video displays or, in some instances, by superimposing the image of the student on the outline of the professional.

In still other systems, a computer animation of the professional's swing is made, or a computer animation of a golf swing, which is a composite swing formed from the swings of many professionals, is used. In the instance where a computer animation is used, the student sees either a simple computer model of a golfer or the outline of a golfer and is instructed to again mimic the swing viewed. One significant disadvantage to utilizing prior computer animation models is that the models have typically been two-dimensional images. The use of such two-dimensional images have provided inadequate visual guidance and/or feedback to the student.

In most systems, the student receives feedback by viewing a video made of his/her golf swing. However, in many of these systems, the feedback is provided after the student has made his/her swing, i.e., the feedback is delayed in time. In other systems, the feedback is provided in real time by projecting the student's video image at the same time that the instructional video is played.

Right-handed students are most likely taught by right-handed instructors. By right-handed it is meant that the swing of the golf club in hitting the golf ball is from the player's right to the player's left. When the instructor faces the student so that the student can observe the instructor, all the movements of the instructor are in the opposite direction that the student must move to mimic the instructor's movements. The mental interpretation that a student must make in viewing the instructor's movements and translating the viewed movements into the student's opposite direction movements impairs the learning process.

There are several problems to be considered in the presentation of performance information to a student or trainee. The student can receive and use only a limited amount of information in a given time period. The inclusion of distraction information in the learning process impedes the student's ability to absorb the skills being taught by forcing the student to use mental resources which might otherwise be used in learning the skills.

Learning a physical skill or manual task such as a golf swing requires the student to simultaneously absorb many different elements of the instructor's stance and movements before during and at the close of the skill or task.

It is desirable to provide a method and apparatus which will make the learning of physical skills, including athletic skills, more efficient and easier.

The primary application of the present invention is improvement in the speed and accuracy of learning physical skills and manual tasks and improvement in the level and consistency of the performance obtained.

SUMMARY OF THE INVENTION

In accordance with the principles of the invention, there is provided a method and system for the training of physical skills or tasks. The system and method of the invention utilizes a video of an instructor in which the video is preprocessed so that it is horizontally flipped to provide a mirror image of the instructor. The student can then observe the instructor such that no mental translation of the instructor's movements need be made by the student. When the right-handed student sees the instructor move, it is as if the instructor is left-handed such that when the instructor moves to the student's right, the student mimics the exact motion by also moving to the student's right.

Still further in accordance with the principles of the invention, the video of the instructor is displayed, not on a video monitor or stationary screen, but is displayed to the student on video glasses worn by the student. By using video glasses, the student can mimic the instructor's posture and motion, including the instructor's head position. The video glasses eliminate the necessity for the student to change his field of vision to view a video monitor.

Still further in accordance with the principles of the invention, a training system includes a video camera which is trained on the student so that the student can observe the motions that he/she makes to visualize how his/her motion corresponds to that of the instructor.

Still further in accordance with the principles of the invention, the instructor video, which is observed by the student, may be played at a speed which is slower than the real time speed of the instructor's actual motion. In addition, the same series of motion by the instructor is repeated for a plurality of sequences.

In a system in accordance with the invention, a video camera is used to record the motion of the instructor. A video processor is used to horizontally flip the image into a mirror image. The mirror image is stored onto a storage medium. A player device is used to play the reverse image onto video glasses worn by a student. A video camera may be used to capture in real time the image of the student attempting to mimic the instructor. The video of the student is played back to the student on the video glasses in real time with the student's movements.

BRIEF DESCRIPTION OF THE DRAWINGS

The invention will be better understood from a reading of the following detailed description taken in conjunction with the drawing figures in which like reference designators identify like elements and in which:

FIG. 1 is a perspective view of an exemplary sports training device in accordance with the invention in use by an instructor;

FIG. 2 illustrates one frame of a video image of the instruction of FIG. 1 unmodified and as would be played back on a video display;

DETAILED DESCRIPTION

Figure 3:
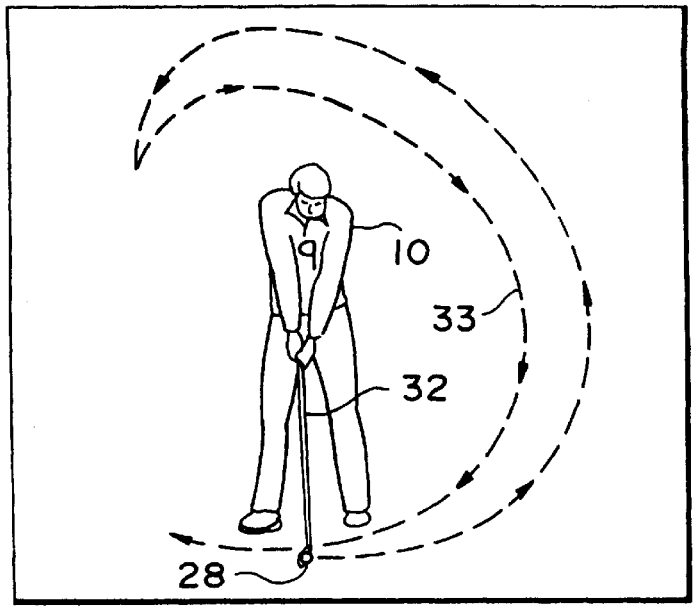
FIG. 3 illustrates one frame of video of the instructor of FIG. 1 processed in accordance with the principles of the invention.

Learning or improving a manual task or a so-called physical skill is commonly done by mimicking the actions of an instructor. Prior learning systems attempted to consider the task as a sequence of distinct motion positions and attempted to have the student observe the motions and then attempt to mimic the motions from memory. However, many motions are complex and the student must learn a family of motions that provides the desired result. Variations in the motions occur in the performance of the task. In a golf swing, for example, as the swing is started, the golfer may realize that the back swing was not as full as desired and must in some way adjust the remainder of the swing.

Typically, an instructor will be positioned in front of a student and show the motion to be performed. The instructor must face the student in order for the instructor to be able to observe the student and to provide verbal feedback and corrective instruction to the student. However, if the student and the instructor are both right-handed or both left-handed, the instructor's motions will always be the reverse of the student when the instructor faces the student. The student must then mentally translate the observed motions to his own actions in the opposite direction of the instructor. If the instructor and the student are of opposite hand, i.e., the student is right-handed and the instructor is left-handed, then when the instructor faces the student and demonstrates the motion being taught, the instructor and the student will always move in the same direction. However, in this instance, the instructor, when giving the student instruction verbally, must always remember to translate his instructions to the opposite hand for the student. For example, if the instructor moves his left foot and desires to have the student move correspondingly, the instructor must remember to tell the student to move his right foot rather than the left.

These visual or verbal translations are distracting and we have discovered that they significantly impair the ability of students to learn physical skills. Accordingly, we have developed a system by which students may more easily and quickly learn new physical skills and to improve existing skills. The system and method of the invention are described below in terms of a golf teaching system and method. It will be apparent that the system and method of the invention has much wider application than just teaching golf. The system and method of the invention may be used to teach many types of sports activities such as teaching tennis serves, boxing skills, batting baseballs and other sports activities. In addition, the system and method of the invention may be used to teach physical skills which are required to perform various manufacturing tasks or to operate machinery. Still further, the system and method of the present invention may be used in physical therapy to help patients re-learn various physical activities.

Turning now to FIG. 1, a golf instructor golfer 10 is shown using an exemplary training device 12 configured in accordance with the present invention. The exemplary device is used to teach golf swings and includes a video camera 36, and a video processor 24 and a monitor 25. The video camera 36 may be any one of a commercially available video camera and may, for example, be one of the 8 mm digital type video cameras available from the Sony Corporation. The video processor may likewise be any one of a number of commercially available video processors. In the illustrative embodiment, the video processor 24 is a MacIntosh clone-type computer identified as a Radius 81-110 is used and a commercially available video digital hard disk recording system which allows the computer to capture and process digital video images from the camera 36. In the illustrative embodiment, the digital video hard disk is one which is commercially available from Radiant Telecast. The computer includes a software package that provides video editing capability. In the illustrative embodiment, the software package is either one commercially available under the name Premier or one which is available under the name Radial Edit. Also connected to the computer 24 is a recorder 26 which records the video output produced by means of the video processor 24.

In operation, the golf instructor 10 swings the golf club at his normal speed and using his normal swing at the golf ball 28. The video camera 36 has had its lens 34 adjusted so that a video image captures the entire range of motion of the instructor 10 and the swing of the club 32 is recorded. The video signal is coupled to the computer video hard disk recording system via cable 37. The computer is used to edit the resultant video images which are obtained by horizontally flipping the image to produce a mirror image of the golf instructor 10. The horizontally flipped video is then stored onto a video storage medium which, for example, may be a video tape which is in the video recorder 26. The video tape may be used to record the instructor's swing at its actual speed or it may also be used to record the instructor's swing at half speed or at any other speed.

In the illustrative embodiment, a video tape recorder is used and tapes were produced at one half the actual speed of the swing and also at the actual speed. In each instance, the swing was reproduced several times so that the student can observe the swing a repetitive number of times.

The video camera of FIG. 1 also includes a microphone 34A, which is used to capture sounds, including the sound of the instructor hitting the golf ball 28. Those sounds are recorded with the horizontally flipped image recorded at actual speed.

FIG. 2 illustrates the video of the instructor 10 as it would normally be seen. In this example, the instructor is right-handed. The path of the head of the golf club 32 as the instructor 10 swings the club 32 is shown by the dashed lines 33.

FIG. 3 illustrates the same frame of the video shown in FIG. 2 after it has been processed to provide a horizontally flipped image. A right-handed student viewing the image of FIG. 4 does not have to make any mental translations of the direction of motion as the video is observed. All the motions of the instructor 10 in the horizontally flipped video frame shown in FIG. 3 will be in the same direction that the student will move.

Figure 4:
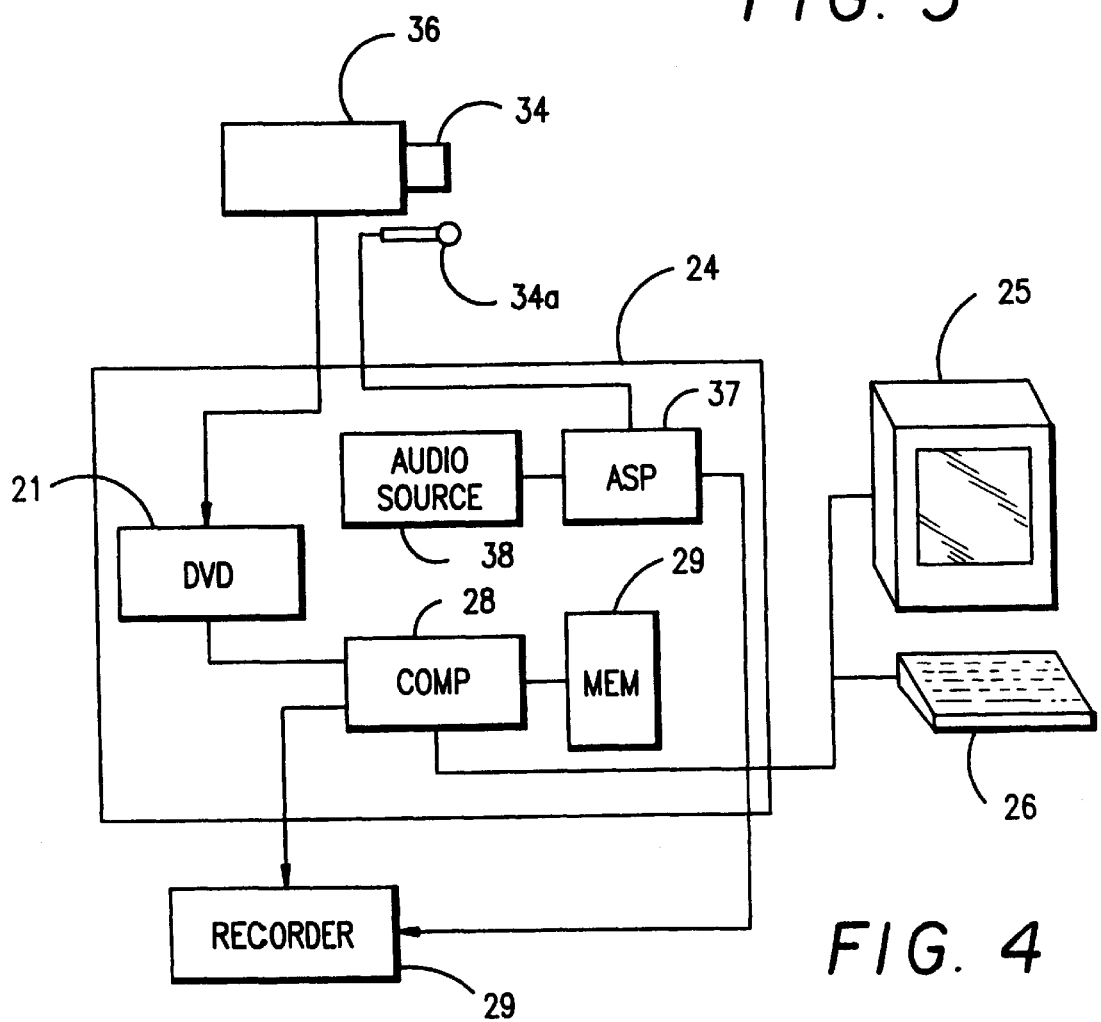
FIG. 4 is a block diagram of the apparatus in accordance with the invention.

Turning now to FIG. 4, a recording system 12 utilized to practice the invention is shown in block diagram form. The system 12 as previously described in conjunction with FIG. 1, includes a video camera 36 to capture video images of an instructor for processing and recording. The video camera 36 has its video output coupled to the video hard disk system 21 which was described in conjunction with FIG. 1. The video hard disk system 21 utilized in the illustrative embodiment is a computer plug-in card which resides in the chassis of the computer 28. The computer 28 including its monitor 25 and keyboard 26, is used to process the video of the instructor. The aforementioned editing software records in computer memory 29. The horizontally flipped video of the instructor is stored onto a storage medium. In the illustrative embodiment, a video tape recorder 29 is used to store the video produced by the video processor 24 on a conventional video tape. It should be understood, that although a standard video tape recorder 29 is utilized in the illustrative embodiment, a digital video recorder may likewise be used. In addition, rather than utilizing a computer 28 in conjunction with a video hard disk system 21, the horizontally flipped video may be produced utilizing conventional video signal processing equipment such as an analog video mixer. In producing the video, the computer system may be used to slow the video such that, for example, the video will show the motion at half speed and the sequence of motion may be recorded several times such that the student has the opportunity to repeat the motion several times without having to adjust equipment. In addition, the same video may further include several sequences of the instructor's sequence of motion at normal speed.

The video processor 24 also includes audio processing capability. More specifically, the camera 36 may also include a microphone 34A to pick up audio sounds such as, for example, the sound of the golf ball 28 being struck by the golf club 32. An audio signal processor 37 is utilized to process the audio signal from the microphone 34A and to record it along with the video by means of the recorder 29. It should also be noted that a separate audio source 38 is provided which may, for example, provide additional audio to be recorded with the video. The additional audio could be music or other information.

Figure 5:
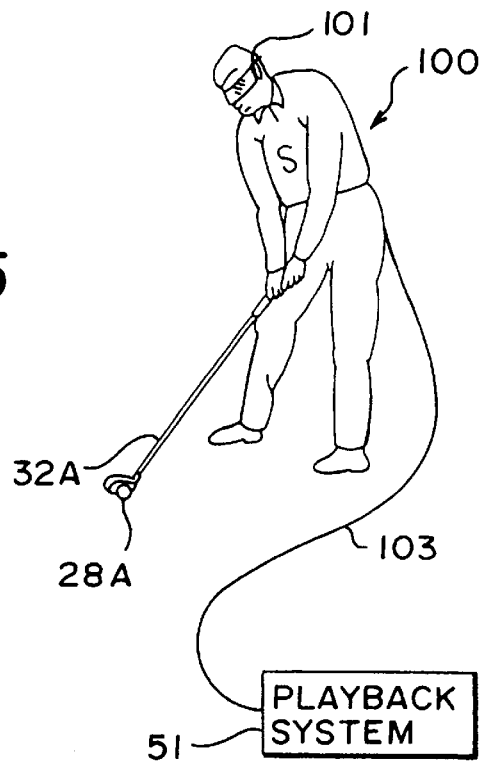
FIG. 5 is a perspective view of an exemplary sports training device in accordance with the invention in use by a student golfer.

Turning now to FIG. 5, a student 100 is shown using an exemplary training device in accordance with the principles of the invention. A video playback system 51 is used to play back the video which was made by the system shown and described with FIGS. 1 through 4. The video playback system 51 is coupled via a video cable 103 to a pair of video glasses 101.

Video glasses 101 are of a type commercially available and are constructed such that the wearer can see through the glasses as well as view a video image on the lenses. One such commercially available set of glasses are Virtual I-O Glasses available from Virtual I-O Inc. of Seattle, Wash. The glasses 101 are connected via a video cable 103 to the video camera 36A. The video tape made by the instructor 10 is played by playback system 51. The student is wearing the video glasses 101 and holds a golf club 32A. A golf ball 28A may or may not be used.

Typically, when a student is initially learning a swing, no golf ball will be used. The video player is started to play the video of the instructor's golf swing. The student is able to view the swing in the video glasses and is also able to see through the glasses to watch his golf club and to address an imaginary ball. The student watches the instructor swing the golf club in the video. After watching the instructor, the student attempts to mimic the instructor's swing and swings along with the instructor on the video. Initially, the swing is performed at a reduced speed such as at half actual speed so that the student can more easily mentally compare his motions and positions with that of the instructor. After the student has mastered the swing at reduced speed, the student views the video of the instructor swinging the golf club at normal speed and again mimics the motions of the instructor. By having the instructor flipped on the video tape, the student does not have the mental distraction of translating the instructor's movements from right to left as would happen if the video of the instructor was not horizontally flipped. In addition, by using the video glasses rather than a video display monitor, the ability of the student to more easily concentrate on the motion to be followed is enhanced. Whenever the student must maintain his view on a fixed object such as a video monitor, the student's ability to concentrate on the motion which is being learned is diminished. In maintaining a golf swing, the golfer's head position is also important. For example, by using the video glasses, the student can concentrate on the golf ball as well as observing the swing of the instructor rather than attempting to switch eye contact from looking at the ball and at a video monitor.

It should be noted that although the advantages of the invention are best obtained from both having a video of an instructor horizontally flipped and using video glasses, the effect of having the instructor video horizontally flipped is significant and in and of itself is a significant improvement over prior golf instructional approaches.

In utilizing a system in accordance with the invention, the effectiveness of learning physical skills is readily apparent from the first time that the system is used by a student. With a system and method in accordance with the principles of the invention, it becomes possible to establish a library of physical skills from which a student can choose which instructor he desires to learn from. For example, the golf swings of various famous golfers could be maintained in a library of reverse image videos from which the student may select which famous golfer's swing he desires to mimic.

Figure 6:
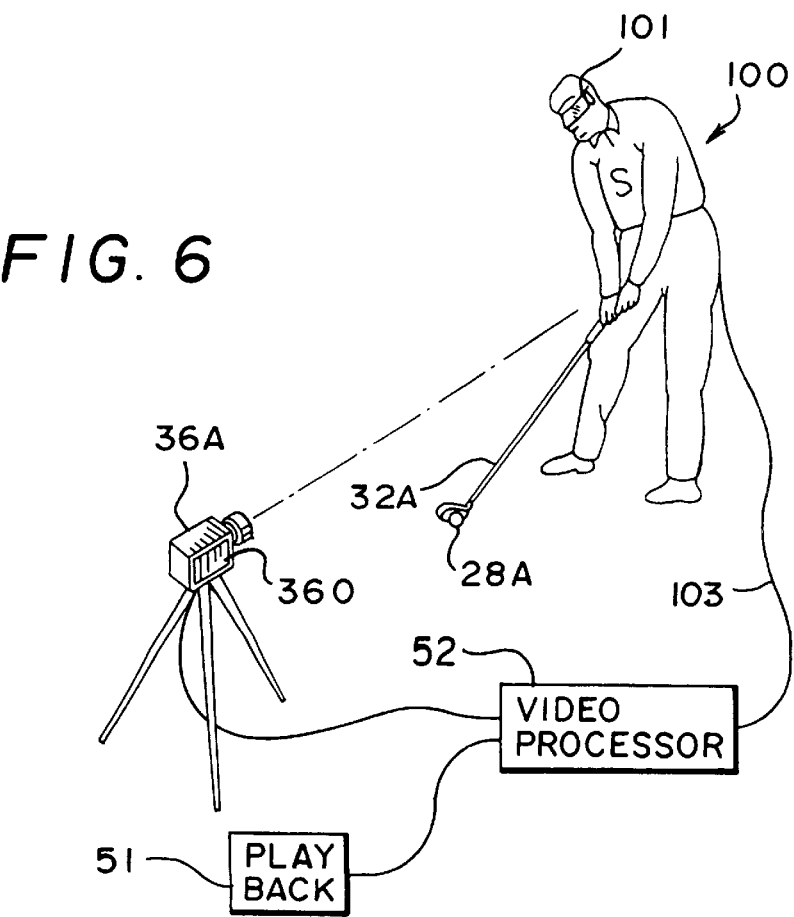
FIG. 6 illustrates the student of FIG. 5 utilizing the system in conjunction with a video camera.

Turning now to FIG. 6, a student 100 is shown using an exemplary training device of the present invention. A video camera 36A is shown which has a video player 360 as an integral part thereof. The video camera may again be a Sony digital video camera. The student 100 is wearing a pair of video glasses 101. In FIG. 6, a playback system 51 is again utilized, but in addition, a video processor 52 is used in conjunction with a video camera 36A. The video processor 52 received real time video signals from a camera 36A and the signals which come from the video playback unit 51. The video processor 52 combines both the real time video signals along with the recorded playback signals to present a combined video image to the student 101. The video processor 52 includes circuitry to again horizontally flip the video output of the camera 36A so that the image that the student sees of himself will be horizontally flipped to provide a mirror image. The video processor 52 is coupled to the video glasses 101 via video cable 103. However, it should be understood, as will be explained later, that rather than a wire connection 103, a wireless connection may be provided between the video processor 52 and the video glasses 101.

Figure 7:
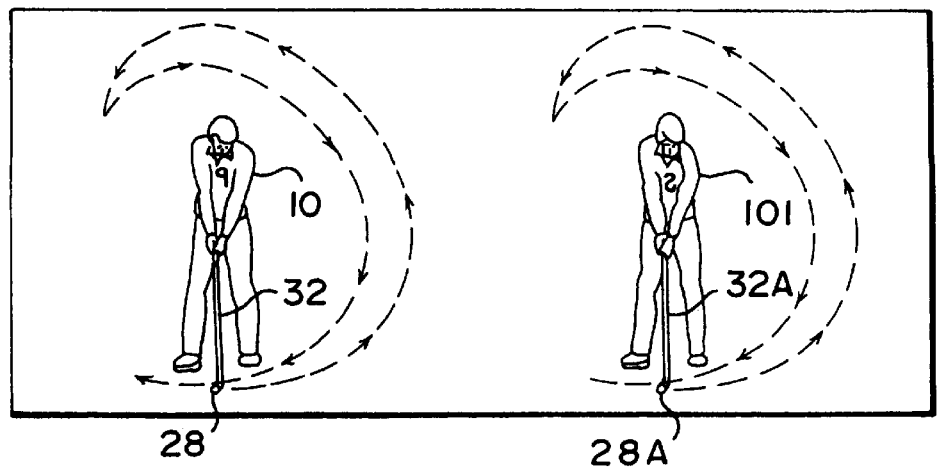
FIG. 7 illustrates the image that the student of FIG. 6 sees on a video display.

FIG. 7 illustrates in graphic form the image that will be seen by the student 100 in the video glasses 101. As shown in FIG. 7, a horizontally flipped image of the instructor 10 will be shown along with the horizontally flipped image of the student 101. Again, in FIG. 7, the swing of the golf club 32 by the instructor 10 and the swing of the golf club 32A by student 101 is indicated in dashed lines. With this arrangement, student can provide for self-teaching by comparing his actions and movements with those of the instructor 10.

The arrangement shown in FIG. 6 demonstrates another feature of the invention. As explained above, it is important for a student to be able to view the horizontally flipped image of an instructor so that the student may more easily mimic the instructor's motions. It is also important for the student to get feedback and it has been found to be particularly advantageous for the student to be able to view his/her own actions. The arrangement shown on FIG. 6 easily permits this to occur. For example, after the student 100 has viewed a video of an instructor showing, for example, a golf swing, and the student has mimicked instructor, the student may utilize the camera 36A to view himself in real time. With video processor 52, the student's image is horizontally flipped so that the student views in video glasses 101, the flipped image of himself as he swings the golf club 32A. It has been found that the combination of being able to view a reverse image of an instructor and, subsequent to that, for the student to view the student's own image horizontally flipped as the student performs the same action provides significant feedback. Thus, one approach that may be utilized with reference to the image that the student sees, is that the student may see only himself in the video display. Alternatively as explained with reference to Fig. 7, the student may see himself simultaneously with viewing the instructor.

Still further, in certain situations, it may be desirable to not horizontally flip either the student's image or that of the instructor being viewed. Video processor 52 may be arranged to provide selective video flipping of any input. Thus, the video processor 52 can selectively provide a horizontal flip from the camera 36A or the playback source 51. If, for example, the student desires to view himself in profile, there is no advantage to horizontally flipping the profile video image of the student. In that circumstance, with the camera 36A positioned to the side of the student 100, the video processor would not provide a horizontal flip but would feed the direct image to the video glasses 101. In other instances, such as where the instructor is a right-handed player and the student is a left-handed player, the video playback image of the instructor would not be horizontally flipped.

Alternatively, the video which is played through the playback unit 51, may not have the horizontally flipped image recorded thereon. In which case, the video processor 52 would provide the horizontal flip of the signal received from the playback unit 51.

Figure 8:
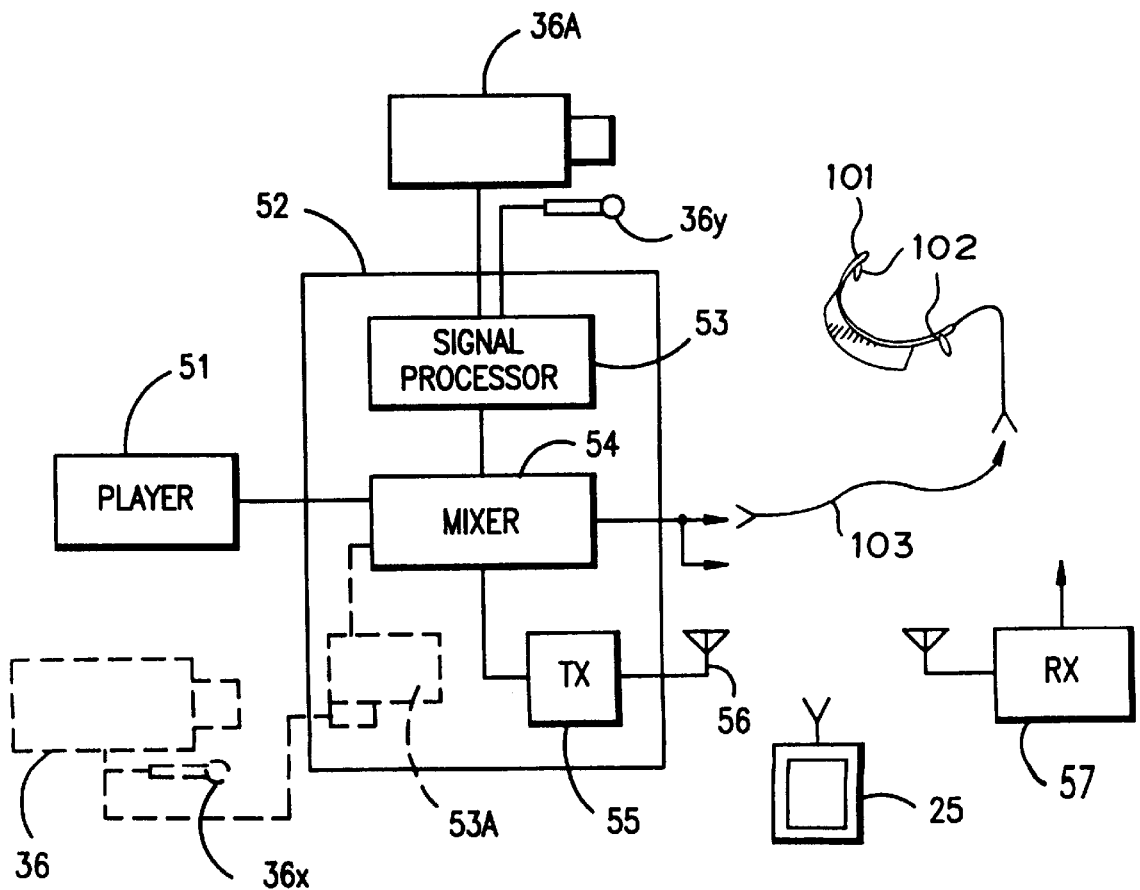
FIG. 8 illustrates in block diagram form the system utilized in FIGS. 5 and 6.

Turning now to FIG. 8, the video processor 52 of FIG. 6 is shown in more detail. The video processor unit 52 includes a signal processor 53 which produces a horizontally flipped video image output. The horizontally flipped image from the signal processor 53 is combined in a video mixer 54 with the video output of the video player 51. The mixer produces a combined video output which will produce the image shown in FIG. 7. The output of the mixer 54, may be coupled to the video glasses 101 via a hard-wired cable 103 which is shown connectorized on each end, or it may be coupled utilizing a wireless arrangement, wherein the video output signal of the mixer 54, is fed to a video transmitter 55 which transmits the video signals via an antenna 56. The video transmitter 55 is any one of a number of commercially-available low power video transmitters. A video receiver 57 may be used to connect to the video glasses 101. The video receiver 57 may be clipped onto the belt of the student. Video receivers of this type are commercially available.

With the video transmitter/receiver combination, the student is not tethered to the system by a video cable. With this wireless system, the student is free to move about. In addition, should the student not desire to wear the video glasses, the video processor 52 may also couple the video signals from the video player 360 to a conventional video monitor 364 via a video cable 365. Still further, in accordance with the principles of the invention, any number of combination of video glasses 101 and monitors 364 may be used simultaneously for training a plurality of students.

Figure 9:
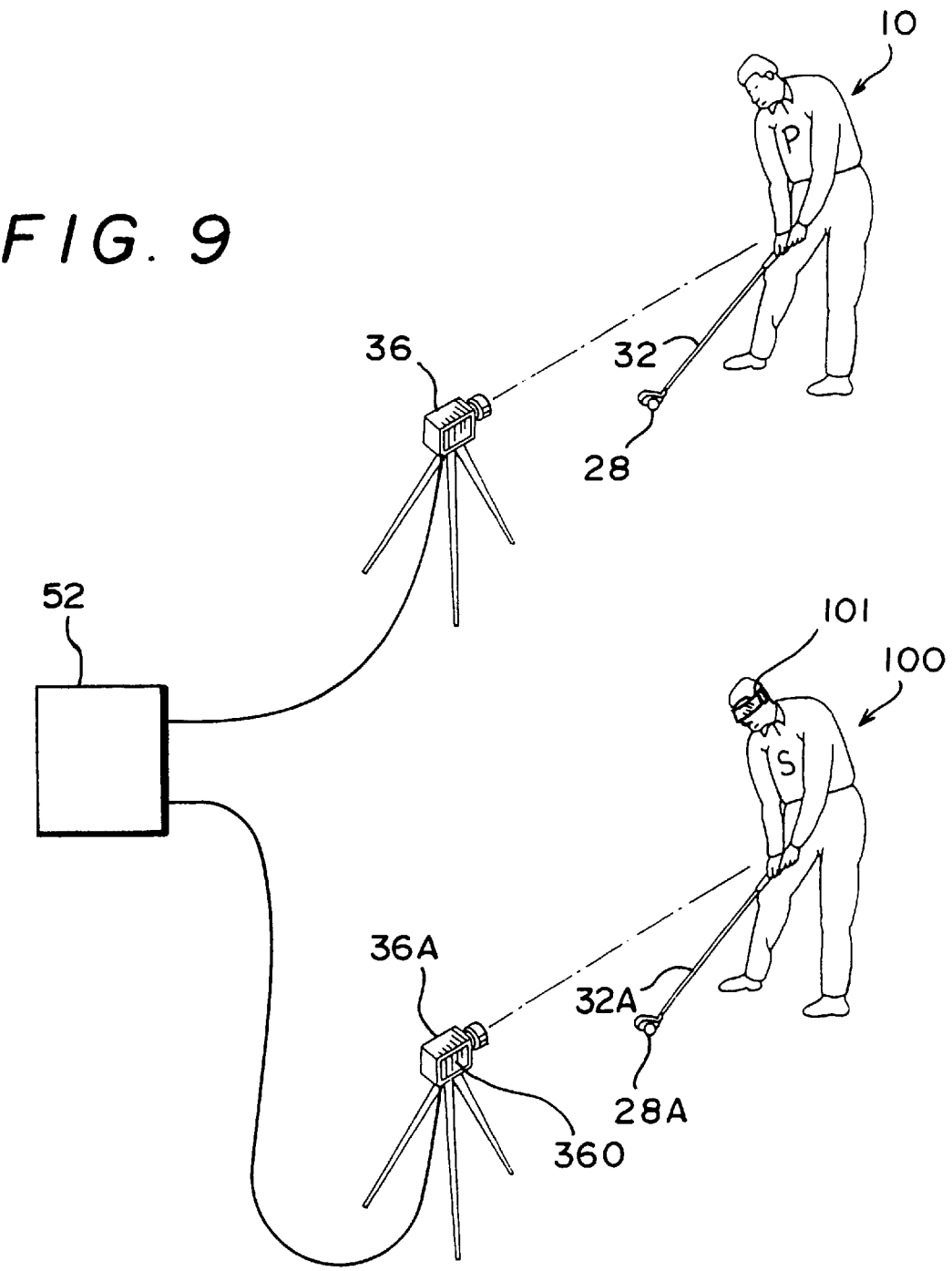
FIG. 9 illustrates a system in accordance with the invention, wherein a live instructor teaches a student.

Turning now to FIG. 9, a live instructor 10 may provide direct instruction to the student 100. In this arrangement, two video cameras are provided, video camera 36 is adjusted to capture the video image of the instructor 10 and video camera 36A captures the image of the student 101. A video processor 52 is again used. The video processor is an illustrative embodiment, the same video processor 52 shown in FIG. 8. However, as shown in outline form in FIG. 8, the video camera 36 is coupled into the mixer 54. The camera 36 is used instead of the video player 51 when the instructor 10 is providing direct instruction to the student 100. A signal processor 53A couples the video output of the camera 36 to the mixer 54 and provides for horizontal flipping of the instructor's image. The instructor may utilize a video monitor 25 or a pair of video glasses 101 also. In addition, camera 36 includes a microphone 36X and the video camera 36A likewise includes a microphone 36Y. The video glasses 101 include earphones 102 which permit the wearer to hear sounds provided along with the video signals. With this arrangement, the instructor can be located some distance away from the student yet view the student on the video display 25 or the video glasses which the instructor is wearing and still communicate verbally with the student as well as visually. Likewise, the student may communicate back verbally to the instructor.

Figure 10:
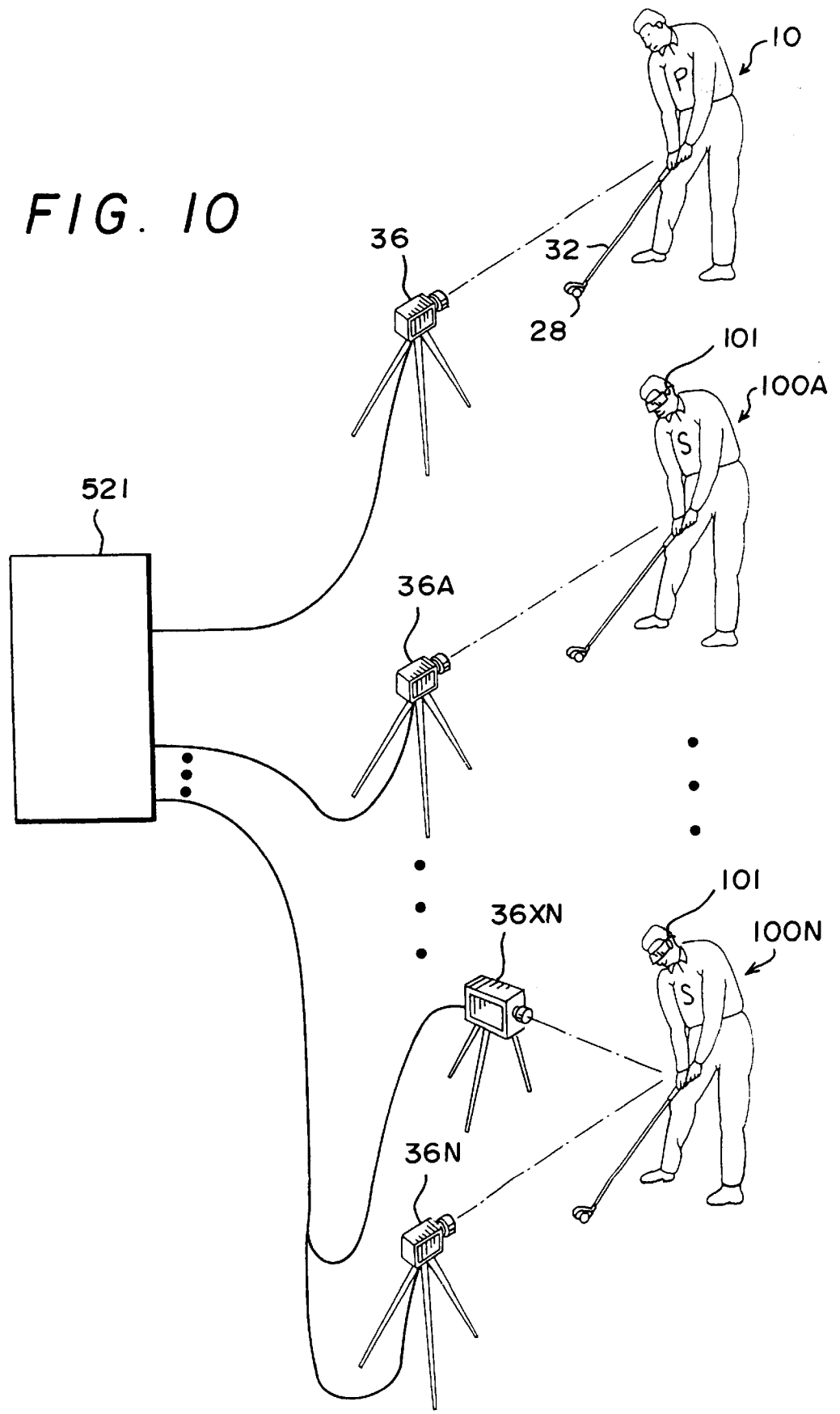
FIG. 10 illustrates an arrangement wherein a plurality of students utilizes a system in accordance with the principles of the invention.

Turning now to FIG. 10, a further arrangement is shown in which a single instructor 10 can teach a large number of students 100A through 100N. A central video processor 521 is provided which replicates the function of the video processor 52 such that a plurality of students may view a pre-recorded video of an instructor or they may all view a live instructor 10 in real time or the instructor 10 may select one or more of the students 100A through 100N to view his real time additional instruction.

Still further in accordance with the principles of the invention, FIG. 10 further illustrates that an additional camera 36XN may be utilized to provide a view of the student from a different direction. Depending upon the view of the camera 36XN, it may not be desirable to horizontally flip the image. For example, when viewed from the side or behind, there is no need to horizontally flip the image of the student. Therefore, the video signal processor may not horizontally flip the video for certain camera views.

Still further in accordance with the principles of the invention, it should be evident to those skilled in the art that certain modifications to the illustrative embodiment may be made and are fully contemplated to within the spirit and scope of the invention.

The video player 51 described in conjunction with FIG. 8, for example, may be a conventional video tape player or it may be in any other source of video information such as a video CD player to provide a so-called "multi-media" output. Or, it may, in fact, be a computerized video source. The computerized video source may include a library of videos, each of which demonstrates a portion of the golf game or golf swings from different professionals, or may include, both horizontally flipped and direct images so that the same video instruction may be used for both left-handed and right-handed players. The library of video views may be on a so-called "CD" or compact disc or may be stored on any medium capable of storing video images. The images may be stored in digital or analog format.

Although the invention has been described in conjunction with a specific embodiment that is described in conjunction with the teaching of golf swings, as described above, the invention is not intended to be limited to the teaching of golf or to the teaching of sports related activities. The system and method of the invention may be used for the teaching of any manner of physical skills or manual tasks without departing from the spirit or scope of the invention. It is intended that the invention be limited in scope only by the following claims.

What is claimed is:

1. A method for training a physical skill to a student by having the student mimic the physical skill demonstrated by a master, comprising:
   capturing one or more video images of the master demonstrating the physical skill;
   forming a training video comprising said one or more images horizontally flipped;
   displaying said training video to said student whereby said student may view said one or more horizontally flipped images and mimic the physical skill demonstrated by said master.

2. A method in accordance with claim 1, wherein:
   said training video is a continuous motion demonstration of said physical skill.

3. A method in accordance with claim 2, wherein:
   said training video comprises a first set comprising one or more of said one or more horizontally flipped images.

4. A method in accordance with claim 3, wherein:
   said display step comprises displaying said training video at a first speed less than the speed in real time of said physical skill.

5. A method in accordance with claim 4, wherein:
   said training video comprises a second set comprising one or more of said one or more horizontally flipped images of said physical skill at said real time speed.

6. A method in accordance with claim 1, wherein:
   said training video is displayed on video display glasses worn by said student.

7. A method in accordance with claim 6, comprising:
   displaying one or more captured real time image of said student on said video glasses simultaneous with said training video.

8. A method in accordance with claim 1, comprising:
   suspending displaying said training video to said student; and displaying one or more captured live real time images of an instructor to said student, said one or more live images of an instructor being horizontally flipped.

9. A method of producing an instructional video for teaching a physical skill, comprising:
   producing video signals representative of images of an instructor performing the physical skill;
   processing the video signals to produce a training video comprising said images horizontally flipped; and
   recording said training video.

10. A method in accordance with claim 9, wherein:
    said physical skill is a golf swing.

11. A video recording of an instructor demonstrating a physical skill or manual task, said video being produced in accordance with the method of claim 9.

12. A video recording in accordance with claim 11, wherein:
    said skill or task is a golf swing.

13. A method for teaching a golf swing to at least one student comprising:
    recording a video of a golf swing performed by an instructor,
    displaying said video on a display unit wearable on the head of said student,
    selectively displaying at least portions of said video horizontally flipped,
    whereby said student mimics the actions of said instructor.

14. A method in accordance with claim 13, comprising:
    selectively displaying a captured live video image of said student on said display unit, wherein said live video image is horizontally flipped.

15. A method in accordance with claim 13, comprising:
    said video display unit is a pair of video glasses.

16. A system for teaching golf comprising:
    video glasses wearable by a student for displaying video images to said student;
    a video source providing video images to said video glasses; and
    a video processor selectively operable to horizontally flip the video images provided to said video glasses.

17. A system in accordance with claim 16, wherein:
    said video source comprises a video camera.

18. A system in accordance with claim 16, wherein:
    said video source comprises a video camera operable to capture video images of said student or an instructor.

19. A system in accordance with claim 16, wherein:
    said video source comprises a video playback unit couplable to said video glasses.

20. A system in accordance with claim 16, wherein:
    said video glasses comprise audio transducers; and
    said video source comprises an audio source.

* * * * *